(No Model.)
F. SCHNEBELIN & O. STRIEGEL.
LATHE STEADY REST.
No. 563,418. Patented July 7, 1896.
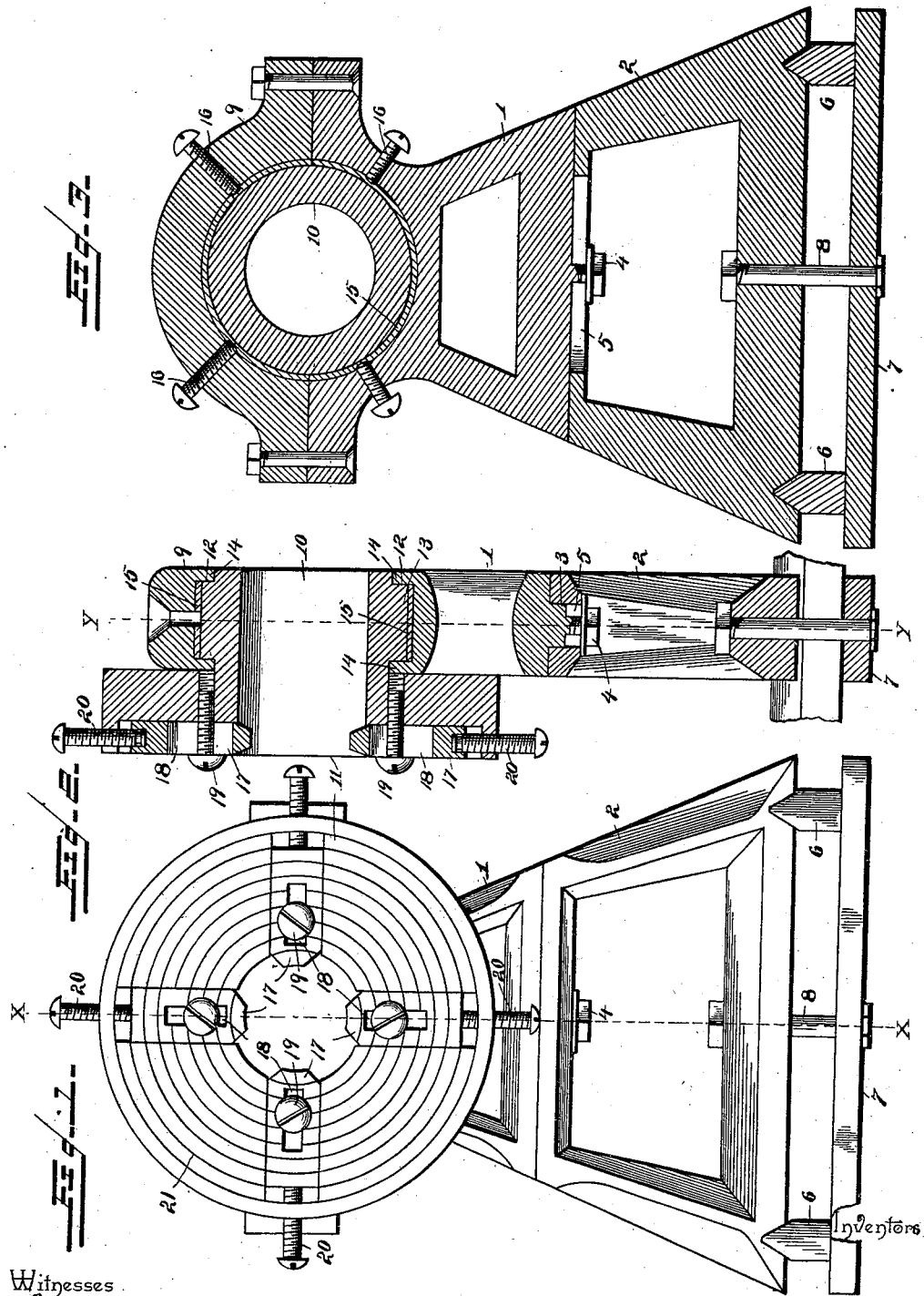
Witnesses
T. W. Riley
V. B. Hillyard
By their Attorneys.
Inventors
Fred Schnebelin
and
Oscar Striegel
C. A. Snow & Co.

UNITED STATES PATENT OFFICE.

FRED SCHNEBELIN AND OSCAR STRIEGEL, OF MASCOUTAH, ILLINOIS.

LATHE STEADY-REST.

SPECIFICATION forming part of Letters Patent No. 563,418, dated July 7, 1896.

Application filed July 3, 1895. Serial No. 554,876. (No model.)

*To all whom it may concern:*

Be it known that we, FRED SCHNEBELIN and OSCAR STRIEGEL, citizens of the United States, residing at Mascoutah, in the county of St. Clair and State of Illinois, have invented a new and useful Lathe Steady-Rest, of which the following is a specification.

The object of this invention is to improve that class of inventions known as "lathe-rests," and which are adapted to operate in connection with tapered or straight work, whereby the efficiency and usefulness of such devices are increased and their adjustment to the particular nature of the work rendered comparatively easy, and whereby provision is had to quickly compensate for wear and prevent any unsteadiness in the work.

Other objects and advantages will become manifest as the nature of the invention is unfolded in the following description, reference being had to the accompanying drawings, in which—

Figure 1 is a front elevation of a lathe-rest constructed in accordance with the present invention. Fig. 2 is a vertical section on the line X X of Fig. 1. Fig. 3 is a section on the line Y Y of Fig. 2.

The standard comprises upper and lower parts 1 and 2, which are connected by means of a tongued and grooved joint 3, whereby the upper part 1 is guided in its lateral movements upon the lower part 2. A bolt and nut 4, having connection with the part 1, operate in a slot 5 in the upper portion of the lower part 2, so as to hold the parts in the required adjusted position. This standard is mounted upon the lathe-bed 6 and is held in place by a yoke 7 and a bolt 8, the latter passing through the foot of the standard and the yoke 7, so as to clamp the lathe-bed between the foot of the standard and the yoke.

The upper portion of the standard is depressed to form a half-bearing, and a cap 9 is attached to the upper portion of the standard and is formed with a half-bearing opposite the half-bearing in the standard, the two half-bearings unitedly receiving and forming a bearing for the hub 10 of the face-plate 11. The cap and upper portion of the standard have oppositely-extending ears, through which pass bolts for securing the parts together and bringing them sufficiently close to secure a close fit between the hub 10 and its bearing. An annular groove 12 is formed in the bearing at the upper end of the standard and provides a seat for the reception of a corresponding annular enlargement 13 of the hub 10, and the edge portions 14 on each side of the annular groove 12 embrace the sides of the annular enlargement 13 and retain the hub in its bearing. To provide for taking up wear, semicircular brasses 15 are fitted in the annular groove 12, one in the half-bearing of the standard, the other in the half-bearing of the cap, and set-screws 16 are provided and fitted into threaded openings of the cap and standard, and are adapted to be turned so as to compress the brasses 15 when it is required to compensate for wear or prevent any looseness of the hub 10 in its bearing.

The face-plate 11 is centrally apertured, which aperture extends through the hub 10 and is designed to receive the work when the latter is properly positioned. A series of jaws 17 are adapted to slide in seats or grooves formed radially in the front side of the face-plate, and these jaws have slots 18, through which pass screws or fastenings 19, by means of which the jaws are retained in their seats. Set-screws 20 operate in threaded openings at the outer closed ends of the seats, and are suitably connected at their inner ends with the jaws, and are intended to move the latter radially in their seats, according as it is required to clamp or release the work. A series of concentric rings 21 are cut or otherwise formed in the front side of the face-plate, and these rings extend across the exposed sides of the jaws, and their purpose is to facilitate the centering and truing of the work and to enable the ready adjustment of the said jaws to any required position.

For tapered work the upper portion of the standard is moved laterally in either direction to the required point, according to the pitch of the taper. This result is effected by loosening the nut on the bolt 4, when the upper part of the standard can be moved into the required position, and when adjusted is fixed by re-tightening the said nut of the bolt 4. The work is clamped to the face-plate by means of the jaws 17 in the usual manner, the said face-plate revolving with the work in the bearing provided at the upper end of the standard in the manner already described. The semicircular brasses 15 and the set-screws 16 afford a ready and convenient means for taking up any wear between the hub 10 and its bearing, thereby making provision to maintain a close joint between the said hub and its bearing, whereby any wabbling or unsteadiness in the work is obviated, which is essential to a neat finish and accurate work.

The rest is intended to be applied to any of the various makes of lathes, and in the embodiment of the same for a particular style of lathe or work it is to be understood that various changes in the form, proportion, and the minor details of construction may be resorted to without departing from the principle or sacrificing any of the advantages of this invention.

Having thus described the invention, what is claimed as new is—

1. In a rest for lathes and similar machines, the combination of a standard having a bearing at its upper end and a detachable cap-plate, and having the inner side of the bearing formed with an annular groove, a face-plate having its hub portion formed with an annular enlargement to enter the said annular groove, semicircular brasses located wholly within the aforesaid annular groove and between it and the annular enlargement, a series of set-screws mounted in threaded openings of the bearing and adapted to engage with the terminal portions of the semicircular brasses to compress them to compensate for wear and prevent any lost motion, clamping-jaws slidably mounted in grooves in the outer side of the face-plate, and means for adjusting the clamping-jaws and positively securing them in an adjusted position, substantially as set forth.

2. A lathe-rest constructed substantially as herein shown and described, the same comprising upper and lower parts having a tongue-and-groove joint between their meeting faces, and having a longitudinal slot formed in one of the parts, a bolt for adjustably connecting together the said parts, a bearing at the upper end of the rest formed with an annular groove, a face-plate having a hub formed with an annular enlargement to operate in the annular groove of the said bearing, semicircular brasses interposed between the annular groove of the bearing and the annular enlargement of the hub, two pairs of set-screws disposed to engage with the end portions of the semicircular brasses for compressing the latter, radially-disposed clamping-jaws fitted in seats in the outer side of the face-plate so as to come flush with the latter, and having a series of concentric grooves or rings provided on the face-plate and extending across the clamping-jaws to enable the proper positioning of the latter, set-screws for adjusting and moving the clamping-jaws, and binding-screws operating in slots of the clamping-jaws to hold the latter in the located position, substantially as set forth.

In testimony that we claim the foregoing as our own we have hereto affixed our signatures in the presence of two witnesses.

FRED SCHNEBELIN.
OSCAR STRIEGEL.

Witnesses:
 H. DANBER,
 HY. MALLRICT.